United States Patent Office 3,234,001
Patented Feb. 8, 1966

3,234,001
PESTICIDAL COMPOSITION AND METHOD
William J. Gaiser, Portland, Oreg., assignor to Pacific Adhesives Company, Inc., a corporation of Oregon
No Drawing. Filed Nov. 29, 1961, Ser. No. 155,815
16 Claims. (Cl. 71—2.6)

This invention relates to agents for fixing insecticidal, fungicidal, herbicidal, fertilizing and other agricultural compositions.

When such compositions are applied to normal use, they necessarily are exposed to weathering conditions which often remove the active component from the site of application before the desired effect has been gained. Accordingly it has been the practice to incorporate in insecticidal sprays and dusts, a fixing agent to fix the active insecticidal component to the plant or other situs of application, preventing it from being washed or blown away and prolonging effective life. Known fixing agents for this purpose are the proteinaceous adhesives such as soluble animal blood which glue the components to the plant and then, upon exposure to sunlight, gradually become insoluble and prevent the insecticide from being removed prematurely from the plant.

Such fixing agents are not as effective as they should be, however, for two reasons. First, their insolubilization by ultraviolet light takes appreciable time so that the insecticidal or other active components may be washed or blown away during the interim period before fixing has been achieved, particularly if weather conditions are adverse. Second, the proteinaceous adhesives are subject to rapid putrefaction upon weathering. As a result they are converted to water-soluble degradation products which easily are swept away from the plant, sharply reducing the duration of the period of effective insecticidal activity.

Accordingly it is the general object of the present invention to provide water-soluble proteinaceous fixing agents for agricultural sprays and dusts which in the first instance adhere the spray or dust to the plant, and which thereafter become converted to a water-insoluble condition of controlled stability, thereby determining the length of time the composition will hold the spray or dust on the plant under weathering conditions.

It is another object of the present invention to provide a fixing agent which is well adapted for inclusion in a wide variety of solid and liquid insecticidal, herbicidal, fungicidal of fertilizing compositions, which is active under a wide variety of atmospheric and environmental conditions without damaging plants to which it is applied and without impairing the effectiveness of the compositions in which it is incorporated.

Yet another object of the present invention is a provision of a fixing agent adapted for use in compounding fertilizers and other granular or pelletized agricultural products, creating granules of controlled stability against weathering and accordingly controlling the rate of release of the fertilizer or other agent to the soil.

Another important object of the present invention is the provision of a method for treating plants with sprays and dusts by applying to the plant a spray or dust in which is included an efficient fixing agent which becomes effective soon after application to the plant and which retains its effectiveness for a long period of time.

Generally stated the fixing agents of the present invention comprise a water-soluble, ultraviolet-light-denaturable, proteinaceous adhesive and a water-soluble inorganic compound of chromium used in amount sufficient to accelerate the denaturing of the protein by ultraviolet light but insufficient to cause per se substantial protein precipitation or denaturing.

When a spray or dust incorporating the above fixing agent is applied to the plant, the chromium compound exerts a unique action in catalyzing promptly the conversion by ultraviolet light of the proteinaceous adhesive from a water-soluble form to a water-insoluble form, thereby fixing it to the plant. In addition, the chromium compound controls the deterioration of the proteinaceous adhesive, thereby preventing its premature decomposition by bacteria and atmospheric agents and prolonging its effective life. In this way the stability of the product against weathering may be controlled at any desired level.

The proteinaceous component of the herein described fixing agent comprises any of the water-soluble, ultraviolet-light-denaturable, proteinaceous adhesives such as soluble milk protein, animal glue, soya flour and, particularly, animal blood. The latter is a preferred proteinaceous material because of its superior qualities of water and weather resistance.

The animal blood may comprise either water-soluble liquid animal blood, or water-soluble dried animal blood. The former may be prepared by declotting fresh animal blood by passing it through a hammermill equipped with a screen, optionally difibrinating the declotted blood, as by allowing it to stand for a suitable period of time, and then decanting the liquid portion from the solid residue. The water-soluble spray dried blood may be prepared by atomizing declotted, defibrinated blood prepared as above into a reaction chamber heated, for example, to a temperature of about 250° F., for a drying time of about 5 seconds under conditions such as to produce a finely divided, powdery, blood product.

In the alternative, the dried blood may be prepared by conventional roll drying, tray drying, vacuum drying, or other techniques which produce a water-soluble blood product.

The chromium compounds which as a class are uniquely suitable for reaction with the proteinaceous adhesive in the preparation of the herein described fixing agents comprise in general the water-soluble, inorganic compounds of chromium. Examples of suitable chromium compounds are the water-soluble, chromous compounds such as chromous chloride and chromous nitrate; the water-soluble, chromic compounds such as chromic chloride, chromic bromide, chromic fluoride, chromic nitrate, chromic sulfate, and chromic acetate; and, particularly, the water-soluble chromate and dichromate compounds including ammonium, potassium, and sodium chromate and dichromate.

Three general methods of preparation of the fixing agents are applicable depending upon whether a liquid or solid product is desired.

In the first, designed for the preparation of a liquid product, declotted liquid animal blood or other liquid proteinaceous material is mixed with the predetermined proportion of chromium compound, using a sufficient amount of the latter to accelerate, upon application to the plant, the denaturing of the protein by ultraviolet light, but insufficient to cause per se a substantial coagulation or denaturing of the protein.

The amount required to achieve this purpose will vary, depending upon the identity and concentration of the chromium compound and other factors, but in general will be between 0.1 and 35 parts of chromium compound for 100 parts of protein material, by weight, on a solids basis. The use of at least 0.1 part of chromium compound is required to show in some degree the desired effect. On the other hand, the use of more than 35 parts of chromium compound results in premature protein denaturing.

In most instances, optimum denaturing of the protein after application to the plant and upon exposure to ultraviolet light is achieved when from 1-10 parts of the chromium compound per 100 parts of protein material is included in the composition.

The production of the fixing agent is carried out simply by mixing together in a suitable reaction vessel, equipped with means for agitation, the predetermined quantities of protein, chromium compound and water. The reaction temperature may vary between the freezing temperature of the mixture and the heat-coagulation temperature of the protein which, in the case of liquid blood, is about 120° F. Preferably the reaction is carried out at ambient temperature.

The duration of the reaction is sufficient to insure complete reaction of the protein and chromium compound. This usually is indicated by an observable color change which, when blood is employed as the protein, constitutes a change from the inherent color of the blood to a characteristic red-brown color. When a protein other than blood is used, and where accordingly a characteristic color reaction is not present, the proportion of combined protein may be determined by direct titration of the free chromium in the mixture. In general, a time of from 15–30 minutes is required to complete the reaction.

Auxiliary materials may be added to the reaction mixture if desirable or necessary. In particular, in the case of aqueous sprays, pH control agents may be included to maintain the pH at a value of less than 8, preferably less than 7. In general, it is desired to keep the pH as low as possible while still retaining solubility of the protein. This insures rapid insolubilization of the protein and prevention of the precipitation of insoluble basic compounds of chromium.

When making the fixing agents in solid form, a preferred procedure is to mix the liquid proteinaceous material, e.g. declotted liquid blood with the predetermined proportion of chromium compound and water. Preferably the chromium compound is dissolved in the water and then the one liquid is added to the other slowly with mechanical agitation.

After stirring until mixing is complete, the resulting mixture is sprayed under pressure into a chamber heated to a temperature of about 250° F. It is maintained in the chamber for a time period of from 5–10 seconds, thereby forming a spray dried product which includes both the protein and the chromium compound. Such a product is favored for commercial production since it can be transported from place to place and stored with minimum expense and maximum convenience.

Still a third way of preparing the presently described fixing agents is to mix intimately in the predetermined proportions the solid proteinaceous material in finely divided form, e.g., spray dried animal blood, with the finely divided, solid, chromium compound. This likewise leads to the preparation of the fixing agent in solid form, readily adapted to transportation and storage. The reaction between the components then is completed when they are subject to the action of moisture, either upon being compounded into an aqueous spray, or in situ on the plant surfaces after being applied as a dust.

The above described fixing agents are intended for use with any type of active product which is to be applied to a surface and retained there for a period of time in spite of the action of wind, rain and other weathering factors. They are intended particularly for use in fixing the active pesticidal components of insecticidal, fungicidal, and herbicidal sprays and dusts on plants to which they are applied.

They are compatible with a wide variety of inorganic and organic insecticidal materials and the vehicles in which they are contained. Thus they may be used to advantage with organic insecticides such as dichlorodiphenyl trichloro-ethane, benzene hexachloride, manganese ethylenebisdiothiocarbamate-2,2' dichlorophenoxy acetic acid, hexachlorocyclohexane, malathion, rotenone and the like. They are also compatible with such inorganic insecticides and fungicides as copper sulfate, tribasic copper sulfate, copper oxide, zinc sulfate, sulfur, the various arsenicals, and the like.

Where the fixing agents are to be used in sprays, together with the insecticidal or other active ingredients of the spray they may be incorporated in any of the usual liquid vehicles as solutions or emulsions. Thus they may be combined with water, naphtha and other petroleum distillates, or any of the usual spray solvents, using from 0.01 to 10 pounds of fixing agent and the usual proportion of active ingredient for each 100 gallons of spray.

Where the fixing agents are to be used as components of insecticidal or other dusting materials, the solid vehicle may comprise any of the usual materials including clay, bentonite, talc, diatomaceous earth, powdered soapstone, or limestone, precipitated calcium carbonate, wood flour, bark powder, and the like. The dust then is prepared by mixing together the solid vehicle and insecticide, used in the conventional proportions, and from 0.01 to 25 pounds of fixing agent for each 100 pounds of finished dust.

Where the fixing agents are to be used to prevent the premature deterioration of granular or pelletized products, the fertilizing or other active component of the granules is mixed with the fixing agent, a filler, if desired, and with other ingredients such as weed killers, in the desired proportions, using from 0.01 to 25 pounds of fixing agent for each 100 pounds of granular product. The mixture then is compounded and formed into granules or pellets as in a pellet press or by extrusion and subdivision to a suitable size.

In the alternative, the fixing agent may readily be sprayed over the surfaces of preformed granules or pellets. This is particularly desirable where the granules or pellets comprise individual crystals or aggregates of crystals.

The fixing agents of the invention and their application in sprays, dusts and granules are illustrated in the following examples:

*Example 1*

This example illustrates the preparation of the fixing agents of the invention in liquid form.

Fresh beef blood from the slaughter house was declotted by passing it through a hammermill equipped with a screen. It then was defibrinated by allowing it to stand for 30 minutes and decanting the liquid fraction from the solid fibrin residue.

From 0.1–10 parts by weight, solid basis, of sodium dichromate or other water soluble, chromium compound then was dissolved in water and the resulting solution added with stirring to the declotted, defibrinated blood. Upon continued stirring the color of the mixture changed to a permanent deep red. The reaction was complete, and the liquid fixing agent ready for use, after a reaction time of from 5–15 minutes.

*Example 2*

This example illustrates the preparation of the fixing agents of the invention in solid form.

20 pounds of liquid beef blood was declotted and defibrinated as described in Example 1. 0.08 pound of sodium dichromate dissolved in 100 ml. of water then were added to the liquid blood slowly, with stirring.

After the constituents had been mixed, the resulting mixture was stirred for an additional five minutes. It then was sprayed, using a fluid pressure of 48 p.s.i.g. and an air pressure of 60 p.s.i.g., into a continuously operating, heated drying chamber; the temperature at the chamber inlet being 255° F. and at the outlet, 149° F. The dwell time in the drying chamber was 5 seconds.

The product was a finely divided reddish powder comprising the reaction product of the blood and the chromium compound. It was readily soluble in water even after a storage period of several months.

*Example 3*

This example illustrates the amount of chromium compound which will react with the proteinaceous component of the fixing agent.

Declotted, defibrinated liquid beef blood prepared as in Example 1 was divided into 50 ml. portions. Varying amounts of sodium dichromate ($Na_2Cr_2O_7 \cdot 2H_2O$) were dissolved in 50 ml. of tap water. Each dichromate sample then was added to one of the blood samples while stirring with a mechanical agitator operated at 1600 r.p.m. Each reaction mixture was stirred for 5 minutes. 50 ml. portions of each reaction mixture then were transferred into each of two petri dishes, one of which was exposed to sunlight for 4 hours and the other of which was not thus exposed but was retained covered in the laboratory.

Both samples were analyzed for soluble components to determine the degree of insolubilization of the blood, the results being expressed as the difference, $\Delta S$, in percent insoluble solids between the exposed and unexposed samples. The values obtained are given in Table I.

TABLE I

| $Na_2Cr_2O_7 \cdot 2H_2O$ Amount employed (percent) | $Na_2Cr_2O_7 \cdot 2H_2O$ Amount reacted (percent) | $\Delta S$ (percent) |
| --- | --- | --- |
| 0 | 0 | 4.77 |
| 2 | 1.87 | 15.50 |
| 3 | 2.81 | 18.40 |
| 4 | 3.80 | 25.50 |
| 5 | | 34.20 |
| 7 | | 46.40 |
| 8 | | 50.70 |
| 9 | | 74.37 |
| 10 | 9.09 | 80.30 |
| 11 | | 77.00 |
| 15 | 10.02 | 79.14 |
| 20 | | 80.40 |
| 25 | 9.80 | 80.20 |
| 30 | | 80.00 |

It is apparent from the foregoing that maximum insolubilization of the blood is obtained by reacting it with about 10% by weight, solids basis, of sodium dichromate.

*Example 4*

This example illustrates the equivalency of the water-soluble inorganic chromium compounds for the purpose of the present invention, and the inapplicability of compounds other than chromium compounds.

The procedure of Example 3 was repeated, using 9% by weight various chemicals, based on the weight of protein, and measuring the degree of insolubilization of the blood after the indicated exposure time. In this case, however, each sample was exposed to artificial ultraviolet light rather than to sunlight in an exposure cabinet equipped with 2–15 watt ultraviolet tube type lamps, generating a wave length of approximately 3600 A. This light source was equipped with a polished parabolic aluminum reflector. The samples in the petri dishes were exposed a distance of 12 inches from the light source, uniformly for a time period of 16 hours.

The results are given in Table II below in terms of $\Delta S$, i.e., the difference in precent of the soluble solids contained in the ultraviolet light exposed and unexposed samples.

TABLE II

| Chemical used: | $\Delta S$, percent |
| --- | --- |
| None | 4.77 |
| Chromic acetate | −92.60 |
| Chromic chloride | 98.63 |
| Chromic bromide | 100.00 |
| Chromic fluoride | 100.00 |
| Chromic nitrate | 95.44 |
| Chromic sulfate | 99.47 |
| Ammonium dichromate | 57.00 |
| Sodium dichromate | 74.37 |
| Sodium chromate (unacidified)* | 70.30 |
| Sodium chromate (acidified solution) | 77.8 |
| Sodium moylbdate | 0 |
| Sodium tungstate | 0 |
| Potassium aluminum sulfate | 3.0 |
| Ammonium aluminum sulfate | 4.0 |
| Silver nitrate | Precipitated |
| Aluminum chloride | Precipitated |
| Uranyl nitrate | 6.0 |
| Uranyl sulfate | 8.60 |
| Hydrochloric acid (sufficient to lower pH to just above acid coagulating point) | 5.00 |

* At ⅕ film thickness.

It is apparent from the foregoing that the water-soluble chromium compounds all have the desired effect regardless of their valence state and that the insolubilizing and hence fixing action demonstrated by the chromium compounds is not demonstrated to a substantial degree by other inorganic agents.

*Example 5*

This example illustrates the application of the herein described chromium compounds to the preparation of compositions having controlled stability to weathering.

To 50 ml. of declotted and defibrinated liquid beef blood was added 50 ml. of water in which was dissolved the selected amount of the selected chromium compound. The solution was stirred for 15 minutes to insure complete reaction.

A thin film of the solution was spread on 6—3 x 3″ glass plates and exposed to ultraviolet light in the cabinet described in Example 4 for 18 hours. The samples then were inoculated with mold cultures placed in a mold cabinet maintained at 80° F. with 100° humidity.

After the indicated time interval, one plate of each solution was removed and sprayed with a given quantity of water under pressure. The percent protein retained on the plate was approximated visually, it being noted that the percent retained remained constant until protein putrescence occurred, after which it dropped rapidly to 0 retention. The results are given in Table III below.

TABLE III

| Chemical | Chemical use (percent by weight) | Retention after 6 hours in mold cabinet (percent) | Days to attain 0% retention |
| --- | --- | --- | --- |
| None | | 5 | 3 |
| Chromic chloride | 2 | 40 | 6 |
| Do | 6 | 90 | 5 |
| Chromic nitrate | 2 | 40 | 5 |
| Chromic sulfate | 2 | 40 | 4 |
| Sodium chromate | 9 | 50 | 60 |
| Sodium dichromate | 2 | 50 | 17 |
| Do | 9 | 100 | >120 |
| Chromic nitrate | 2 | } 60 | 10 |
| Sodium dichromate | 1 | | |
| Chromic chloride | 2 | } 60 | 10 |
| Sodium dichromate | 1 | | |

It is to be observed from the above data that the compositions most stable to weathering are those containing increased amounts of chromate and dichromate compounds.

*Example 6*

This example illustrates the application of various proteinaceous adhesive materials, i.e., animal blood, animal glue, soya flour and soluble milk protein to the preparation of the fixing agents of the present invention.

A first fixing agent was prepared by adding 0.9 grams sodium dichromate to 50 mls. of liquid beef blood, which had been declotted and defibrinated by the method of Example 1, and stirring until the reaction was complete.

A second fixing agent was prepared by adding 10 grams of animal glue to 70 ml. of water, stirring for 5 minutes and then adding 1.06 grams sodium dichromate issolved in 20 ml. of water. The resulting mixture then was stirred for 5 minutes to complete the reaction.

A third fixing agent was made by adding 10 grams soya flour to 70 ml. water and stirring for 5 minutes. A solution of 0.5 gram of sodium dichromate dissolved in 20 ml. water then was added to the soya flour solution and the resulting mixture stirred for 5 minutes.

A fourth fixing agent was prepared by adding 1.08 grams of sodium dichromate to 100 ml. of skimmed milk (12% solids content). The resulting mixture then was stirred for 5 minutes to complete the reaction.

Two 5 ml. samples of each of the foregoing fixing agents were pipetted into 3 inch petri dishes. One sample of each was exposed for 16 hours to the ultraviolet source described in Example 4 and the other retained covered indoors, without such exposure.

Both samples were analyzed for soluble components to determine the degree of insolubilization of the protein. The results, expressed as the difference $\Delta S$ in percent of insoluble solids between the exposed and unexposed samples, are given below in Table IV.

TABLE IV

| Protein: | $\Delta S$ (percent) |
|---|---|
| Blood | 74.37 |
| Animal glue | 73.98 |
| Soya flour | 71.61 |
| Skim milk | 74.5 |

Example 7

This example illustrates the application of the presently described fixing agents to the formulation of various sprays and dusts.

In all cases, the fixing agent was prepared by spray drying a mixture of declotted, defibrinated animal blood and sodium dichromate as set forth in Example 2. The fixing agent then was mixed with the other constituents of the spray and dust, in the indicated proportions, followed by thorough agitation until homogeneous product was obtained.

SPRAYS

Insecticidal:

A

| | |
|---|---|
| Wettable 50% DDT powder _____lbs__ | 2 |
| Fixing agent _____lbs__ | 0.4–2 |
| Water _____gals__ | 100 |

B

| | |
|---|---|
| Benzene Hexachloride (12% gamma isomer) _____lbs__ | 1½–2 |
| Fixing agent _____lbs__ | 0.3–2 |
| Water _____gals__ | 100 |

C

| | |
|---|---|
| Malathion—50% emulsifiable conc. ____pints__ | 1–2 |
| Fixing agent _____lbs__ | 0.4–2 |
| Water _____gals__ | 100 |

Fungicidal:

D

| | |
|---|---|
| Manganese ethylene bis dithiocarbamate (80% wettable powder) _____lbs__ | 3 |
| Fixing agent _____lbs__ | .05–3 |
| Water _____gals__ | 100 |

E

| | |
|---|---|
| Tribasic Copper Sulfate (53% Cu) _____lbs__ | 1–2 |
| Fixing agent _____lbs__ | .04–2 |
| Water _____gals__ | 100 |

Herbicidal:

F

| | |
|---|---|
| Dimethylamine salt of 2,4-dichlorophenoxy acetic acid (50% solution) _____pints__ | 1–3 |
| Fixing agent _____lbs__ | .04–3 |
| Water _____gals__ | 100 |

DUSTS

Insecticidal:

G

| | Lbs. |
|---|---|
| DDT powder | 5–10 |
| Talc | 90–95 |
| Fixing agent | 0.1–10 |

H

| | |
|---|---|
| Hexachlorocyclohexane | 1–2 |
| Diatomaceous earth | 100 |
| Fixing agent | 0.1–10 |

I

| | |
|---|---|
| Ortho dimethyldithiophosphate of diethyl mercaptosuccinates | 4–5 |
| Powdered soapstone | 100 |
| Fixing agent | 0.1–10 |

Fungicidal:

J

| | |
|---|---|
| Copper sulfate (tribasic) | 5–15 |
| Precipitated calcium carbonate | 100 |
| Fixing agent | .1–15 |

K

| | |
|---|---|
| Manganese ethylene bis diethiocarbamate | 3–12 |
| Talc | 100 |
| Fixing agent | .1–15 |

Example 8

This example indicates the effect of ultraviolet dosage on the rate of protein insolubilization.

50 ml. of declotted, defibrinated liquid beef blood, prepared as in Example 1, was diluted with 50 ml. $H_2O$. To this solution was added 0.9 gram $Na_2CrO_4$. This mixture was then stirred with a mechanical agitator for 5 minutes.

Two 5 gram, 1 gram, and 0.1 gram portions of the foregoing mixture were transferred to 3″ petri dishes and spread so that the liquid covered the entire surface of the dish. Three sets of dishes were then exposed for 16 hours and 84 hours, respectively, to ultraviolet irradiation as shown in Example 4, thus exposing different thicknesses of material. The results expressed as the difference, $\Delta S$, in percent of insoluble solids between the exposed and unexposed samples are given in Table V below:

TABLE V

| Grams of material exposed | $\Delta S$ (Percent) 16 hr. exposure | $\Delta S$ (Percent) 84 hr. exposure |
|---|---|---|
| 5.0 | 13.2 | 50.0 |
| 1.0 | 31.0 | 68.7 |
| 0.1 | 70.9 | |

Example 9

This example illustrates the application of the herein described fixing agents in controlling the stability of granular agricultural products.

Two formulations were prepared as follows:

TABLE VI

| Ingredient | Standard formulation | Chrome blood formulation |
|---|---|---|
| Chloro-isopropylcarbamate | 20 | 20 |
| Clay | 80 | 50 |
| Fixing agent as prepared in Example 2 | 0 | 30 |

The above ingredients were dried, blended and pressed into pellets at 5000 p.s.i.g. The pellet size was ¾ inch by ¼ inch by ¹⁄₁₆ inch. The pellets containing the chrome-blood formulation were irradiated for 24 hours under a mercury arc lamp (15 watt; ultraviolet at approximately 2600 A.).

100 milligram samples of the pelletized material were placed in 200 milliliters of distilled water at room temperature and allowed to stand for a period of time; the mixture then was shaken in a mechanical shaker and allowed to stand for an additional period of time. The mixtures were then centrifuged and the amount of chloroisopropyl carbamate in solution was determined. The test data are given in Table VII.

TABLE VII

| Sample | First soak period, hr. | Shake period, hr. | Second soak period, hr. | Total time, hr. | Percent CIPC in solution |
|---|---|---|---|---|---|
| Standard formulation | 24 | 16 | 44 | 84 | 79.5 |
| Chrome-blood formulation | 84 | 16 | 32 | 132 | 73.0 |

It thus is apparent that substantially less of the active ingredient of the herbicide, i.e., the chloro isopropyl carbamate, was solubilized in the case of the protected pellets of the invention after a soaking period of 132 hours there was solubilized from the standard formulation after a soaking period of but 84 hours.

*Example 10*

This example illustrates the application of the herein described fixing agents in controlling the stability of granular agricultural products by coating them with the fixing agent, as opposed to mixing the fixing agent intimately with them as was the case in Example 9.

100 grams of industrial ammonium sulfate granules was placed in a 150 ml. beaker. 0.8 gram of fixing agent prepared by the method of Example 2 was dissolved in enough water to make a thick slurry. This was added to the ammonium sulfate granules. The resulting mixture was stirred at 1600 r.p.m. for ¼ hour.

Ten grams of the stirred mixture was placed in a 3 inch petri dish and irradiated in an ultraviolet cabinet for 24 hours. Two grams of the irradiated mixture was added to 100 ml. of distilled water, stirred at 1600 r.p.m. for ½ minute, filtered, and rinsed with 2 ml. portions of distilled water. The amount of residue retained on the filter paper, which indicates the degree of protection against weathering agents afforded by the fixing agent, was determined.

The foregoing procedure was repeated, except the ammonium sulfate granules were coated with a fixing agent prepared by reacting commercial spray dried soluble blood with 9% by weight, dry solids basis, of sodium dichromate.

The procedure again was repeated, this time using ammonium sulfate granules per se without any protective coating agent at all.

The results are given in Table VIII below:

TABLE VIII

| Fixing agent: | Weight of residue, mg. |
|---|---|
| Example 2 fixing agent | 47.0 |
| Blood plus 9% sodium dichromate | 59.5 |
| None | 2.5 |

It thus is apparent that the herein discribed fixing agents applied as coating highly soluble materials such as ammonium sulfate effectively protect them against the action of weathering agents.

*Example 11*

This example illustrates the field testing of the fixing agents of the invention. An insecticidal dust was prepared from 99% by weight commercial DDT dust, and 1% of the fixing agent of Example 2. The resulting composition was applied by plane to a portion of a field planted to corn. A control composition identical to the foregoing except that it omitted the fixing agent, was applied to an adjacent portion of the same field. During application it was observed that the addition of the fixing agent assisted in the flowability of the dust, the pattern made by the plane with the test composition being much improved over that obtained with the control dust.

The field was inspected after a time period of several days during which it had been exposed to three very heavy spring rain showers. Leaf samples taken from the test and control plots indicated a 95% retention of the dust on the test plot, on which the fixing agent had been used. A retention of but 5% was observed on the control plot.

In addition, a substantial amount of active DDT remained on the test plot at the end of the season, 60 days later. None remained on the control plot. This result is to be contrasted with the known fact that DDT applied without the presently described fixing agent is completely inactivated in the field after but 14 days.

Having thus described my invention in preferred embodiments, I claim as new and desire to protect by Letters Patent:

1. The process of preparing a fixing agent for use in agricultural sprays, dusts and granules of controlled stability to weathering, the process comprising; mixing in aqueous medium a water-soluble inorganic salt of chromium, and at least one water-soluble ultraviolet-light-denaturable protein of the class consisting of water-soluble animal blood, animal glue, soya flour and soluble milk protein, from 0.1–35 parts by weight, dry weight basis, of chromium salt being used for each 100 parts of protein.

2. The process of claim 1 wherein the protein comprises water-soluble animal blood.

3. The process of claim 1 wherein the salt of chromium comprises sodium dichromate.

4. The process of claim 1 wherein the protein comprises water-soluble animal blood and the salt of chromium comprises sodium dichromate used in amount of from 0.1–10 parts by weight for each 100 parts of blood, dry weight basis, and wherein the reaction between the salt of chromium and the protein is carried out at a temperature of from the freezing point of the reaction mixture to about 120° F.

5. The process of claim 1 including the step of drying the reaction mixture to solid form.

6. The process of claim 1 including the step of spray-drying the reaction mixture by spraying it into a chamber heated to a temperature of about 250° F. and maintaining the mixture at said temperature for from about 5–10 seconds.

7. A fixing agent for use in agricultural sprays, dusts and granules of controlled stability to weathering, said fixing agent comprising: the reaction product of at least one water-soluble, ultraviolet-light-denaturable protein of the class consisting of water-soluble animal blood, animal glue, milk protein and soya flour, with a water-soluble inorganic chromium salt used in an amount of from 0.1–35 parts by weight of chromium salt for each 100 parts of protein, dry weight basis.

8. The fixing agent of claim 7 wherein the protein comprises water-soluble animal blood.

9. The fixing agent of claim 7 wherein the chromium salt comprises a dichromate salt.

10. The fixing agent of claim 7 wherein the protein comprises water-soluble animal blood, and the chromium compound comprises sodium dichromate, used in the proportion of from 0.1–10 parts by weight for each 100 parts blood.

11. An agricultural spray of controlled stability to weathering comprising a pesticidal agent, a liquid vehicle therefor, and a fixing agent therefor, from 0.01–10 pounds of fixing agent being employed for each 100 gallons of spray, the fixing agent comprising the reaction product of at least one water-soluble ultraviolet-light denaturable protein of the class consisting of water-soluble animal blood, animal glue, milk protein and soya flour, and a water-soluble inorganic salt of chromium, used in an amount of from 0.1–35 parts by weight of chromium salt for each 100 parts by weight of protein, dry weight basis.

12. The agricultural spray of claim 11 wherein the chromium salt is sodium dichromate and the protein is water-soluble animal blood employed in the ratio of from 0.1–10 parts sodium dichromate for each 100 parts of blood.

13. An agricultural dust of controlled stability to weathering comprising a pesticidal agent, a solid carrier therefor, and a fixing agent therefor, from 0.01–25 pounds of fixing agent being employed for each 100 pounds of dust, the fixing agent comprising the dried reaction prodduct of at least one water-soluble ultraviolet-light denaturable protein of the class consisting of water-soluble animal blood, animal glue, milk protein and soya flour, and a water-soluble inorganic salt of chromium, used in an amount of from 0.1–35 parts by weight of chromium salt for each 100 parts by weight of protein, dry weight basis.

14. The agricultural dust of claim 13 wherein the chromium salt is sodium dichromate and the protein is water-soluble animal blood, used in amount of 0.1–10 parts chromium salt for each 100 parts of blood.

15. The method of making pelletized proteinaceous agricultural compositions stabilized against atmospheric deterioration, which comprises pelletizing a mixture comprising a solid agricultural agent and a fixing agent therefor, the fixing agent comprising the reaction product of a water-soluble, inorganic chromium salt and at least one water-soluble ultraviolet-light-denaturable protein of the class consisting of water-soluble animal blood, animal glue, soya flour and soluble milk protein, the chromium salt being used in an amount of from 0.1–35 parts by weight for each 100 parts of protein, dry weight basis; and irradiating the resulting pellets with ultraviolet light for denaturing and stabilizing selectively the reaction product content of the pellet surfaces.

16. The method of treating plants with a pesticidal formulation which comprises applying to the plants a pesticidal amount of a composition comprising the reaction product of at least one water-soluble, ultraviolet-light denaturable protein of the class consisting of water-soluble animal blood, animal glue, milk protein and soya flour, with a water-soluble inorganic chromium salt used in amount of from 0.1–35 parts by weight for each 100 parts of blood, dry weight basis.

References Cited by the Examiner

UNITED STATES PATENTS

| | | | |
|---|---|---|---|
| 1,496,436 | 6/1924 | Steinhart | 167—42 |
| 1,568,455 | 1/1926 | Hedenburg | 167—14 |
| 2,381,752 | 8/1945 | Iler | 260—113 X |
| 2,431,256 | 11/1947 | Keil. | |
| 2,728,652 | 12/1955 | Hance | 71—2.4 |
| 2,847,293 | 8/1958 | Harris | 71—2.4 |
| 2,849,334 | 8/1958 | Hart | 260—113 X |

OTHER REFERENCES

Aston et al., "Jr. of Agriculture;" March 20, 1934, pages 172–173.

Frear, "Chemistry of Pesticides," copyright 1955, pages 409–421 (page 421 of special interest).

LEWIS GOTTS, *Primary Examiner.*

MAURICE A. BRINDISI, JULIAN S. LEVITT,
*Examiners.*